(12) United States Patent
Hayashi

(10) Patent No.: US 10,810,916 B2
(45) Date of Patent: Oct. 20, 2020

(54) IMAGE PROCESSING APPARATUS AND IMAGE PROCESSING METHOD

(71) Applicant: SONY CORPORATION, Tokyo (JP)

(72) Inventor: Masatsugu Hayashi, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 141 days.

(21) Appl. No.: 15/030,319

(22) PCT Filed: Aug. 8, 2014

(86) PCT No.: PCT/JP2014/070977
§ 371 (c)(1),
(2) Date: Jun. 20, 2016

(87) PCT Pub. No.: WO2015/064169
PCT Pub. Date: May 7, 2015

(65) Prior Publication Data
US 2016/0293073 A1    Oct. 6, 2016

(30) Foreign Application Priority Data
Oct. 28, 2013  (JP) .................. 2013-222887

(51) Int. Cl.
*G09G 3/00*  (2006.01)
*G09G 5/18*  (2006.01)
(Continued)

(52) U.S. Cl.
CPC ............ *G09G 3/003* (2013.01); *G09G 5/18* (2013.01); *G09G 5/391* (2013.01); *H04N 13/189* (2018.05); *G09G 2310/08* (2013.01); *G09G 2320/0252* (2013.01); *G09G 2320/0606* (2013.01); *G09G 2340/0407* (2013.01); *G09G 2340/0464* (2013.01); *G09G 2354/00* (2013.01); *H04N 2213/00* (2013.01)

(58) Field of Classification Search
None
See application file for complete search history.

(56) References Cited

U.S. PATENT DOCUMENTS 5,510,832 A *   4/1996  Garcia ............... H04N 13/341
348/56
2010/0226628 A1*  9/2010  Yamaji ............... G11B 27/329
386/353
(Continued)

FOREIGN PATENT DOCUMENTS

JP   2001-350455 A   12/2001
JP   2006-267663 A   10/2006
(Continued)

*Primary Examiner* — Christopher Braniff
(74) *Attorney, Agent, or Firm* — Chip Law Group

(57) ABSTRACT

An image processing apparatus is an image processing apparatus including an acquisition unit and a control unit. The acquisition unit acquires image signal information that is used in displaying an image based on a transmitted image signal, from the image signal. The control unit controls, based on operation information relating to a user's operation for changing a display mode of the image and the image signal information acquired by the acquisition unit, a display delay in displaying the image.

9 Claims, 12 Drawing Sheets

(51) Int. Cl.
*H04N 13/189* (2018.01)
*G09G 5/391* (2006.01)

(56) References Cited

U.S. PATENT DOCUMENTS

2011/0074771 A1* 3/2011 Tsukagoshi ............. G06T 15/00
　　　　　　　　　　　　　　　　　　　345/419
2012/0120194 A1* 5/2012 Newton ............... H04N 13/194
　　　　　　　　　　　　　　　　　　　348/43

FOREIGN PATENT DOCUMENTS

| JP | 2006267663 | * | 10/2006 |
| JP | 2010-088092 | A | 4/2010 |
| JP | 2011-223457 | A | 4/2011 |
| JP | 2012-065160 | A | 3/2012 |
| WO | 99/027711 | A | 6/1999 |
| WO | 2010/095403 | A | 8/2010 |

* cited by examiner

IMAGE PROCESSING APPARATUS AND IMAGE PROCESSING METHOD

CROSS REFERENCE TO RELATED APPLICATIONS

This application is a U.S. National Phase of International Patent Application No. PCT/JP2014/070977 filed on Sep. 4, 2014, which claims priority benefit of Japanese Patent Application No. JP 2013-224901 filed in the Japan Patent Office on Oct. 30, 2013. Each of the above-referenced applications is hereby incorporated herein by reference in its entirety.

TECHNICAL FIELD

The present technology relates to an image processing apparatus and more particularly relates to an image processing apparatus that processes an image to be displayed, an image processing method, and a program that causes a computer to execute the method.

BACKGROUND ART

Conventionally, many image processing apparatuses for displaying various images (e.g., game content, stereoscopic image) have been proposed. For example, there has been proposed a video display device that includes a selector that turns on/off a low-delay processing mode and displays various images (e.g., game screen) based on a video signal input from an external apparatus (e.g., see Patent Document 1).

Patent Document 1: Japanese Patent Application Laid-open No. 2011-223457

SUMMARY OF INVENTION

Problem to be Solved by the Invention

In the above prior art, when the low-delay processing mode is turned on, a signal process is started after a predetermined time has elapsed from the start of a storage process in a frame memory. Therefore, for example, in a case where an image based on a signal from a game machine is displayed, a delay time can be shortened by turning on the low-delay processing mode.

Now, for example, a case where a user's operation for changing a display mode of an image being displayed is performed is assumed. As this user's operation, an operation such as cropping display, scaling display, and display position change is assumed. In this case, a start timing of reading out from the frame memory and an end timing of screen display are changed. In such a case, if the delay time is shortened, there is a fear that an image signal that has not been completely written in the frame memory may be read out. Therefore, it is important to set a suitable display delay depending on a user's operation.

The present technology has been made in view of such situations and it is an object thereof to set a suitable display delay.

Means for Solving the Problem

The present technology has been made for overcoming the above-mentioned problem and a first aspect thereof is an image processing apparatus, an image processing method, and a program that causes a computer to execute the method, the image processing apparatus including an acquisition unit that acquires image signal information that is used in displaying an image based on a transmitted image signal, from the image signal, and a control unit that controls, based on operation information relating to a user's operation for changing a display mode of the image and the acquired image signal information, a display delay in displaying the image. With this, an action of controlling the display delay in displaying the image based on the operation information relating to the user's operation for changing the display mode of the image and the image signal information is provided.

Furthermore, in this first aspect, the control unit may calculate a delay amount in reading out the image signal from a frame memory storing the image signal and control the display delay based on the delay amount. With this, an action of calculating the delay amount in reading out the image signal from the frame memory and controlling the display delay based on this delay amount is provided.

Furthermore, in this first aspect, the control unit may calculate, when an instruction operation for cropping display is received as the user's operation, the delay amount, using a read-out start position of the image signal in the frame memory that is determined according to the user's operation. With this, an action of calculating the delay amount, when the instruction operation for cropping display is received, using the read-out start position of the image signal in the frame memory.

Furthermore, in this first aspect, the control unit may calculate, when at least one of an instruction operation for scaling display and an instruction operation for display position change is received as the user's operation, the delay amount, using display position and display size of the image in a display region of a display unit that are determined according to the user's operation. With this, an action of calculating, when the at least one of the instruction operation for scaling display and the instruction operation for display position change is received, the delay amount, using the display position and display size of the image in the display region of the display unit is provided.

Furthermore, in this first aspect, the control unit may calculate the delay amount when an image based on an image signal for displaying a stereoscopic image is displayed. With this, an action of calculating the delay amount when the image based on the image signal for displaying the stereoscopic image is displayed is provided.

Furthermore, in this first aspect, the control unit may calculate the delay amount, using a period in which writing is not performed in writing an image signal as a pair in the frame memory. With this, an action of calculating the delay amount, using the period in which writing is not performed in writing the image signal as the pair in the frame memory is provided.

Furthermore, in this first aspect, the control unit may calculate the delay amount in at least one case of a case where at least one of an instruction operation for cropping display, an instruction operation for scaling display, and an instruction operation for display position change is received as the user's operation and a case where an image based on an image signal for displaying a stereoscopic image is displayed. With this, an action of calculating the delay amount in at least one case of the case where the at least one of the instruction operation for cropping display, the instruction operation for scaling display, and the instruction operation for display position change is received as the user's operation and the case where the image based on the image signal for displaying the stereoscopic image is displayed is provided.

Furthermore, in this first aspect, the control unit may calculate the delay amount, using at least one of a read-out start position of the image signal in the frame memory that is determined according to the user's operation, display position and display size of the image in a display region of a display unit that are determined according to the user's operation, and a period in which writing is not performed in writing an image signal as a pair in the frame memory. With this, an action of calculating the delay amount, using the at least one of the read-out start position of the image signal in the frame memory, the display position and display size of the image in the display region of the display unit, and the period in which writing is not performed in writing the image signal as the pair in the frame memory is provided.

Effects of the Invention

According to the present technology, an excellent effect of being able to set a suitable display delay can be exerted. Note that the effects described here are not necessarily limited and may be any effects described in the present disclosure.

MODE(S) FOR CARRYING OUT THE INVENTION

Hereinafter, an embodiment for carrying out the present technology (hereinafter, referred to as embodiment) will be described. The descriptions will be made in the following order.

1. Embodiment (example of controlling display delay based on operation information on user's operation)

1. Embodiment

[Functional Configuration Example of Image Processing Apparatus]

Figure 1:
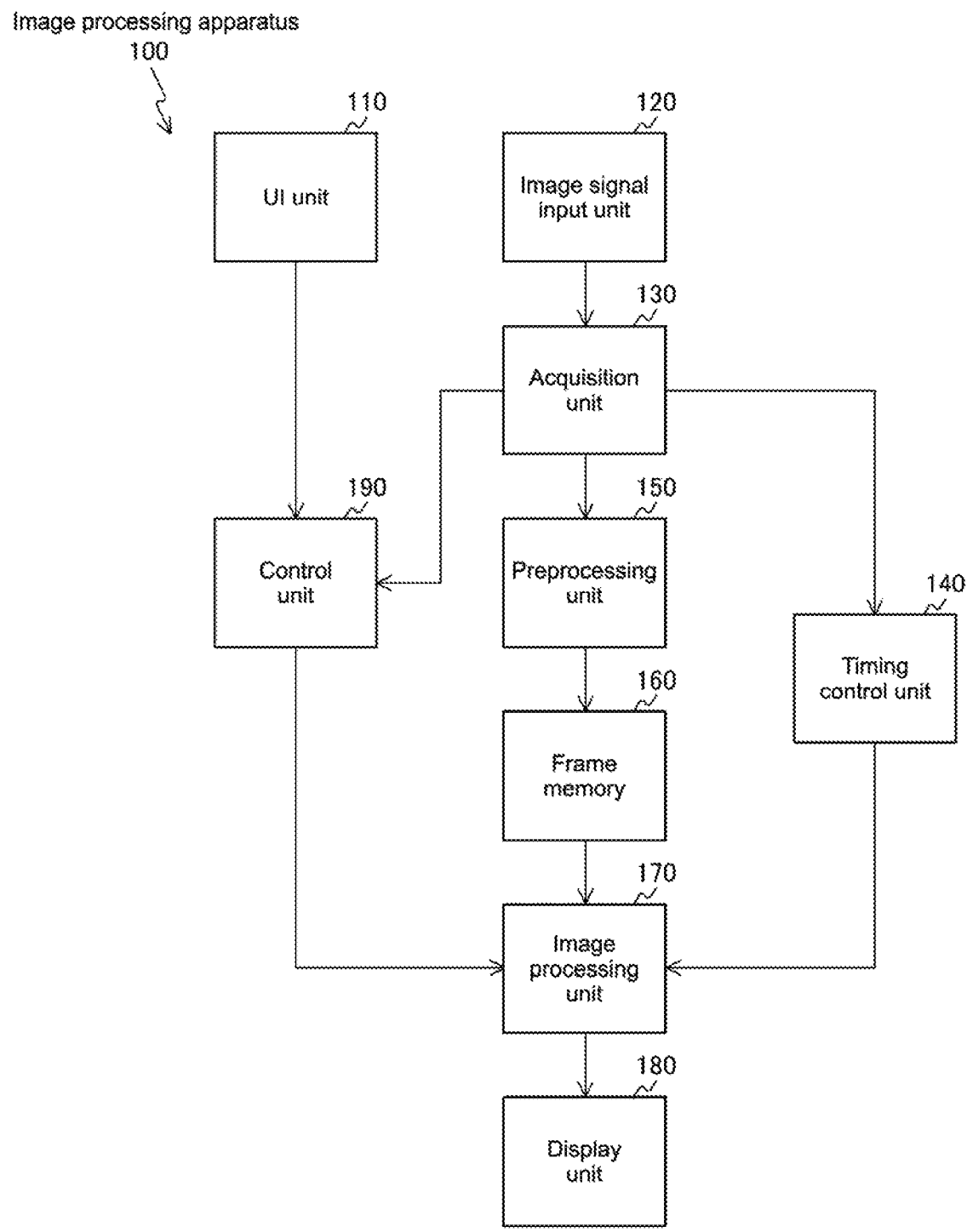
FIG. 1 A block diagram showing a functional configuration example of an image processing apparatus 100 in an embodiment of the present technology.

FIG. 1 is a block diagram showing a functional configuration example of an image processing apparatus 100 in an embodiment of the present technology.

The image processing apparatus 100 includes a UI (User Interface) unit 110, an image signal input unit 120, an acquisition unit 130, a timing control unit 140, a preprocessing unit 150, a frame memory 160, an image processing unit 170, a display unit 180, and a control unit 190. For example, the image processing apparatus 100 is realized as a television receiver that receives broadcasting waves from broadcast stations and displays an image (stereoscopic image (3D (three-dimensional) image) or plane image (2D (two-dimensional) image)). Furthermore, for example, the image processing apparatus 100 is realized as an image processing apparatus (e.g., personal computer, tablet terminal) that receives an image signal from an external apparatus and displays an image (stereoscopic image or plane image). Furthermore, other image processing apparatuses (e.g., image reproduction apparatus, image display apparatus) may be used as the image processing apparatus 100.

The UI unit 110 is a user interface that receives various user's operations and outputs operation information relating to the received user's operation to the control unit 190. For example, various operations relating to the image being displayed on the display unit 180 are received as the user's operations. As various operations, for example, operations for changing the display mode of the image being displayed on the display unit 180 (e.g., instruction operation for cropping display, instruction operation for scaling display, operation of changing screen display position) are received. Note that the UI unit 110 is realized as an operation member, for example, a keyboard, a button, a dial, or a touch panel.

The image signal input unit 120 inputs an image signal (video signal) for displaying an image and outputs the input image signal to the acquisition unit 130. The image signal input unit 120 is realized as, for example, an input apparatus or a tuner of a television receiver that inputs an image signal from the external apparatus. Furthermore, the image signal input unit 120 may receive an image signal via a wired or wireless link.

The acquisition unit 130 acquires, from an image signal output from the image signal input unit 120, image signal information relating to this image signal and outputs the acquired image signal information to the preprocessing unit 150, the timing control unit 140, and the control unit 190. Furthermore, the acquisition unit 130 outputs an image signal output from the image signal input unit 120 to the preprocessing unit 150. For example, the acquisition unit 130 acquires a frequency, an image size, and signal specific information as the image signal information and outputs them to the control unit 190. Furthermore, the image signal information is, for example, information used for displaying an image based on the transmitted image signal. For example, it is information shown in FIGS. 2 and 8.

The timing control unit 140 generates, based on the image signal information output from the acquisition unit 130, a synchronous signal of an image to be displayed on the display unit 180 and outputs the generated synchronous signal to the image processing unit 170.

The preprocessing unit 150 preprocesses an image signal output from the acquisition unit 130 and stores the preprocessed image signal in the frame memory 160.

The frame memory 160 is a memory that stores image signals preprocessed by the preprocessing unit 150 in units of frames and supplies the stored image signal to the image processing unit 170. Note that the image signal input by the image signal input unit 120 is written in the frame memory 160 at the timing of the image signal. On the other hand, reading out from the frame memory 160 is performed at a timing depending on a delay amount calculated by the control unit 190.

The image processing unit 170 reads out an image signal stored in the frame memory 160 and performs various types of image processing on this image signal. The image processing unit 170 displays the image signal after the image processing on the display unit 180. Furthermore, the image processing unit 170 displays, according to a synchronous signal output from the timing control unit 140, the image signal after the image processing on the display unit 180. The image processing unit 170 performs, as the image processing, I/P (Interlace/Progressive) conversion, scaling display, cropping, colorimetry processing, and image-quality control, for example. Furthermore, the image processing unit 170 performs OSD (On Screen Display) superimposition on the image signal after the image processing and displays the image signal after the OSD superimposition on the display unit 180.

The display unit 180 displays an image corresponding to an image signal supplied from the image processing unit 170. The display unit 180 is, for example, a display panel.

The control unit 190 performs various types of control relating to an image to be displayed on the display unit 180 on the basis of the operation information output from the UI unit 110 and the image signal information output from the acquisition unit 130. For example, the control unit 190 calculates, based on the operation information output from the UI unit 110 and the image signal information output from the acquisition unit 130, a delay amount in reading out an image signal from the frame memory 160, and outputs this delay amount to the image processing unit 170. Then, the image processing unit 170 reads out the image signal stored in the frame memory 160 based on that delay amount. In this manner, the control unit 190 calculates a delay amount when the image processing unit 170 reads out an image signal from the frame memory 160, and controls a display delay of an image to be displayed on the display unit 180 based on that delay amount.

[Image Signal Information Example]

Figure 2:
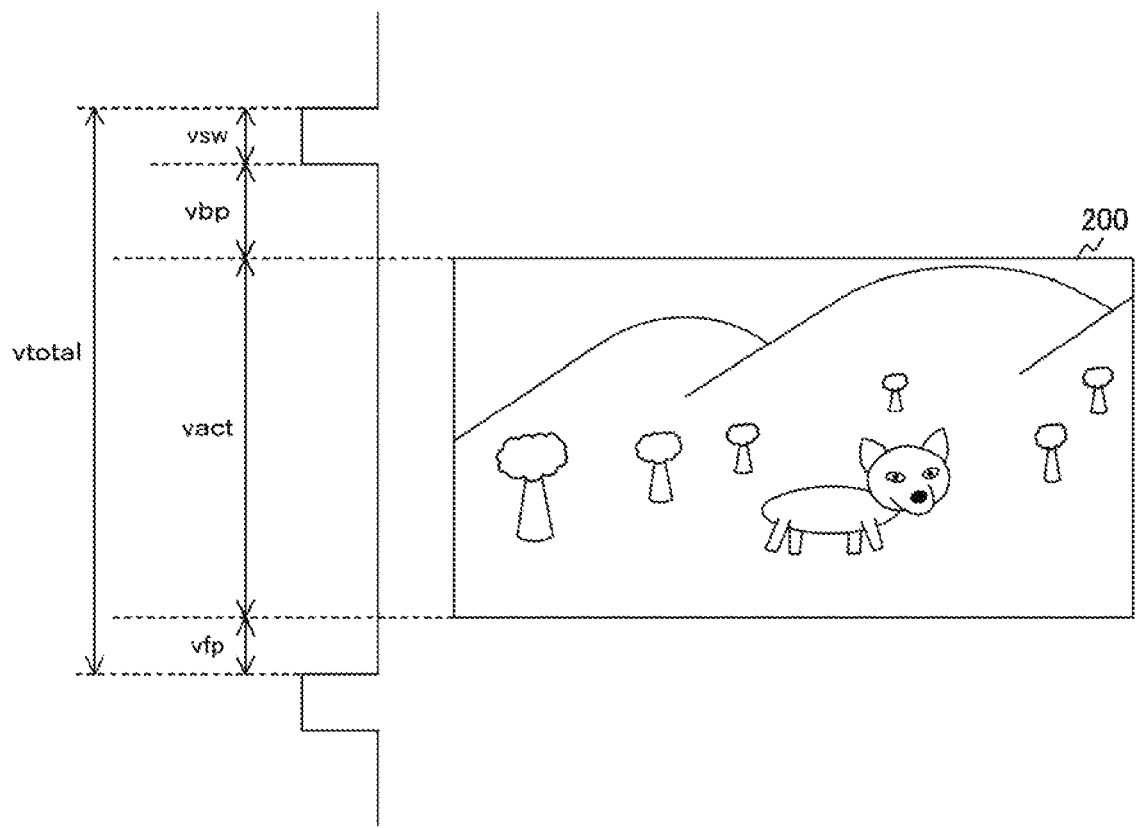
FIG. 2 A diagram showing an example of image signal information acquired by an acquisition unit 130 in the embodiment of the present technology.

FIG. 2 is a diagram showing an example of image signal information acquired by the acquisition unit 130 in the embodiment of the present technology. In FIG. 2, an image 200 to be written in the frame memory 160 is simplified and shown as a rectangle. Thus, the image 200 is an image to be displayed on the display unit 180. Furthermore, FIG. 2 schematically shows a relationship between the image 200 and image signal information (signal specific information) relating to the image 200.

Vsw is a value indicating a perpendicular synchronous signal width (Line). Furthermore, vact is a value indicating a perpendicular effective display period (Line). Thus, vact is a value corresponding to a region of an image 200 to be written in the frame memory 160.

Furthermore, vfp is a value indicating a perpendicular front porch (Line) and vbp is a value indicating a perpendicular back porch (Line). Furthermore, vtotal is a value indicating a perpendicular total period (Line).

[Exemplary Relationship of Writing in and Reading Out from Frame Memory]

Figure 3:
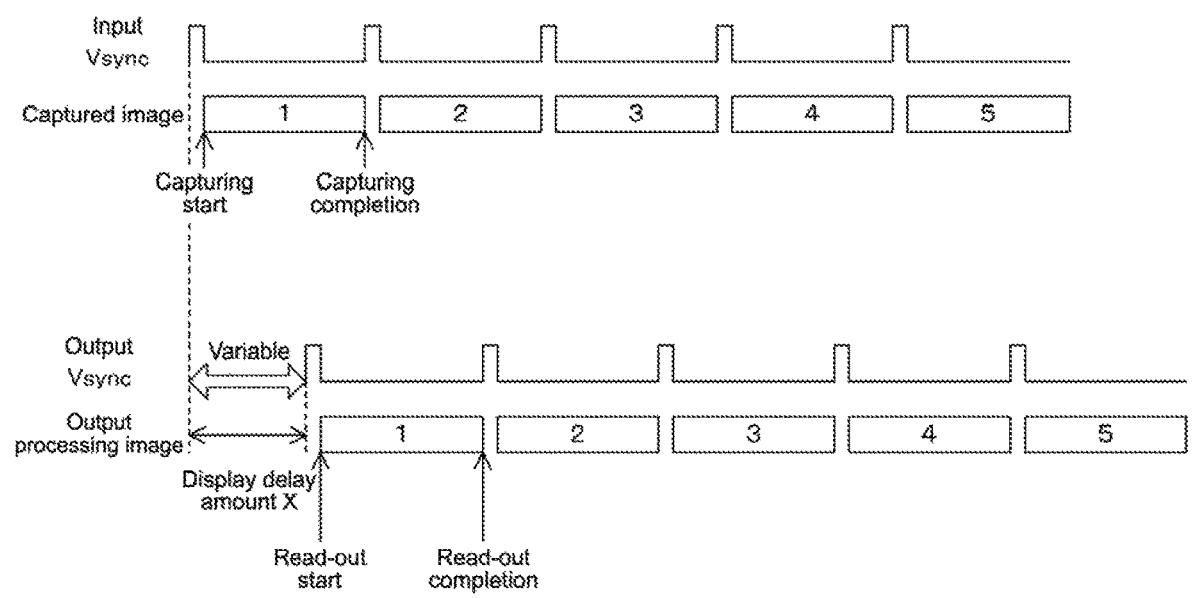
FIG. 3 A diagram showing an exemplary relationship between an image to be written in a frame memory 160 and an image to be read out from the frame memory 160 in the embodiment of the present technology.

FIG. 3 is a diagram showing an exemplary relationship between an image to be written in the frame memory 160 and an image to be read out from the frame memory 160 in the embodiment of the present technology. Note that reading out the image from the frame memory 160 is performed by the image processing unit 170. In FIG. 3, the left and right directions are shown as a time axis.

On the upper side of FIG. 3, an exemplary relationship between an image (captured image) stored in the frame memory 160 and Vsync (perpendicular synchronous signal) is shown. Furthermore, on the lower side of FIG. 3, an exemplary relationship between an image to be read out from the frame memory 160 (output processing image) and Vsync (perpendicular synchronous signal) is shown.

Furthermore, rectangles representing images are denoted by symbols 1 to 5. Specifically, on the time axis, the image 1 is the first image and the image 5 is the last (latest) image.

Furthermore, on the upper side of FIG. 3, the left end portions of the rectangles representing the images 1 and 5 are set as capturing start positions (writing start positions) with respect to the frame memory 160 and the left end portions of the rectangles representing the images are set as capturing completion positions (writing completion positions) with respect to the frame memory 160. Furthermore, on the lower side of FIG. 3, the left end portions of the rectangles representing the images 1 and 5 are set as read-out start positions with respect to the frame memory 160 and the right end portions of the rectangles representing the images are set as read-out completion positions with respect to the frame memory 160.

For reading out the image (captured image) stored in the frame memory 160, the image processing unit 170 performs reading out, delayed by a delay amount calculated by the control unit 190. The calculation of this delay amount will be described with reference to FIGS. 5, 6, and the like in detail.

[Exemplary Relationship Between Writing Speed and Read-Out Speed]

Figure 4:
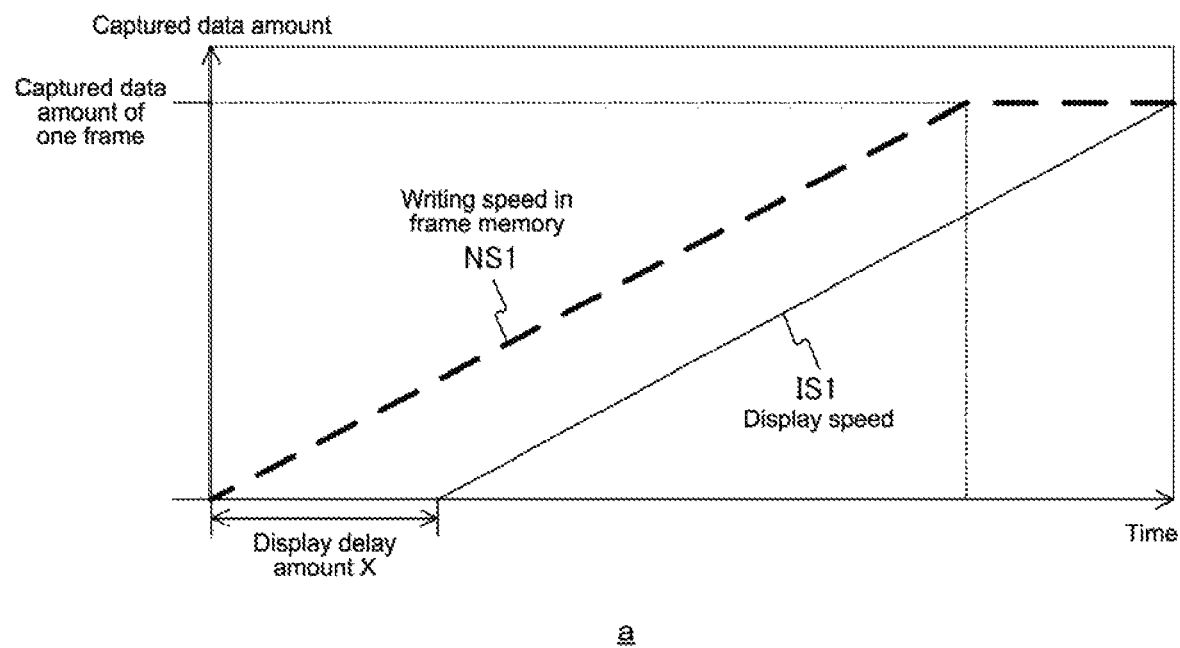
FIG. 4 A diagram showing an exemplary relationship between a writing speed in the frame memory 160 and a read-out speed from the frame memory 160 (display speed of display unit 180) in the embodiment of the present technology.
Figure 4:
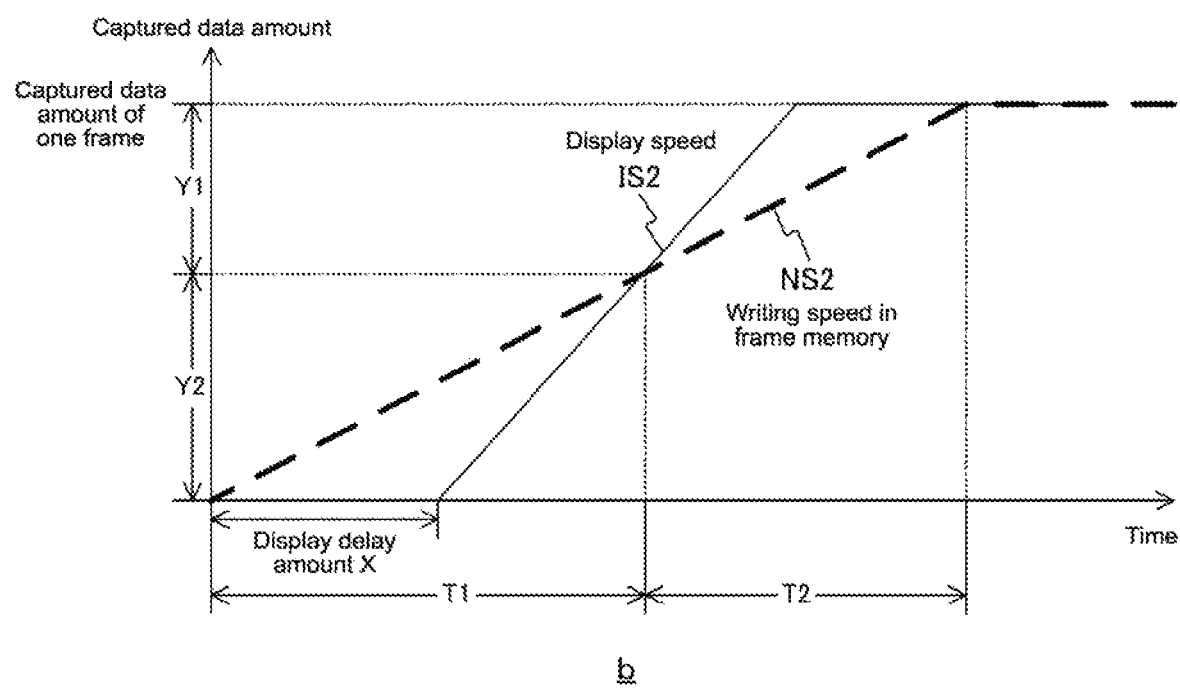

FIG. 4 is a diagram showing an exemplary relationship between a writing speed in the frame memory 160 and a read-out speed from the frame memory 160 (display speed of display unit 180) in the embodiment of the present technology. Note that each of a and b of FIG. 4, the horizontal axis represents a time axis and the vertical axis represents an axis indicating a data amount.

In a of FIG. 4, an example in a case where the image processing unit 170 reads out the image signal stored in the frame memory 160, not overtaking writing, is shown. NS1 is a straight line (thick dotted line) indicating the writing speed in the frame memory 160. Furthermore, IS1 is a straight line indicating the read-out speed from the frame memory 160 (display speed of display unit 180).

Furthermore, in b of FIG. 4, an example in a case where the image processing unit 170 reads out the image signal stored in the frame memory 160, overtaking writing, is shown. NS2 is a straight line (thick dotted line) indicating the writing speed in the frame memory 160. Furthermore, IS2 is a straight line indicating the read-out speed from the frame memory 160 (display speed of display unit 180).

Now, a case where the image processing unit 170 reads out the image signal stored in the frame memory 160, overtaking writing, means, for example, a case where the image signal whose writing in the frame memory 160 is not completed is read out by the image processing unit 170. In this case, an image signal before the image signal that should be read out (thus, immediately preceding frame) is read out by the image processing unit 170.

In b of FIG. 4, Y1 indicates a range of the data amount in which the image processing unit 170 reads out the image signal stored in the frame memory 160, not overtaking writing. Furthermore, Y2 indicates a range of the data amount in which the image processing unit 170 reads out the image signal stored in the frame memory 160, overtaking writing. Furthermore, T1 indicates a time zone in which the image processing unit 170 reads out the image signal stored in the frame memory 160, not overtaking writing. Furthermore, T2 indicates a time zone in which the image processing unit 170 reads out the image signal stored in the frame memory 160, overtaking writing.

Now, a case where content is output from an image processing apparatus such as a PC (Personal Computer) and a game machine is assumed. In this case, in order to prevent the user from feeling a delay (display delay) of a display image signal with respect to an input image signal, it is necessary to reduce the delay amount as much as possible. In view of this, in order to reduce the delay amount, it is conceivable that, for example, the image processing unit 170 processes the image stored in the frame memory 160 to delay the read-out start by a fixed delay amount. In this case, for example, as shown in a of FIG. 4, the writing speed in the frame memory 160 and the read-out speed from the frame memory 160 (display speed of display unit 180) can be set.

Now, a case where instruction operations such as scaling display, cropping display, and display position change are performed by the user is assumed. In this case, it is assumed that a timing when the image processing unit 170 starts reading out from the frame memory 160 and a timing when it ends reading out from the frame memory 160 are changed. For example, as shown in b of FIG. 4, it is also assumed that a relationship between the writing speed in the frame memory 160 and the read-out speed from the frame memory 160 (display speed of display unit 180) is changed. In such a case, there is a possibility that the image processing unit 170 may perform reading out from the frame memory 160 in which writing of the image signal that should be displayed is not completed.

In order to prevent such reading out of the image processing unit 170, setting a fixed delay amount based on, for example, frequency information, an image signal size and limiting the system not to exceed the fixed delay amount is assumed. Furthermore, it is also assumed that when it exceeds the fixed delay amount, the image processing unit 170 delays reading out from the frame memory 160 by a certain period. However, in a case where reading out is performed in this manner, there is a fear that the display delay may be rapidly increased which may make the user feel uncomfortable.

In view of this, in the embodiment of the present technology, an example in which the display delay is controlled based on the operation information relating to the user's operation and the image signal information. With this, it is possible to prevent the display delay from rapidly increasing and to reduce the uncomfortable feeling given to the user. Thus, it is possible to set a suitable display delay.

[Exemplary Calculation of Delay Amount in Case where Cropping Display is Performed]

Figure 5:
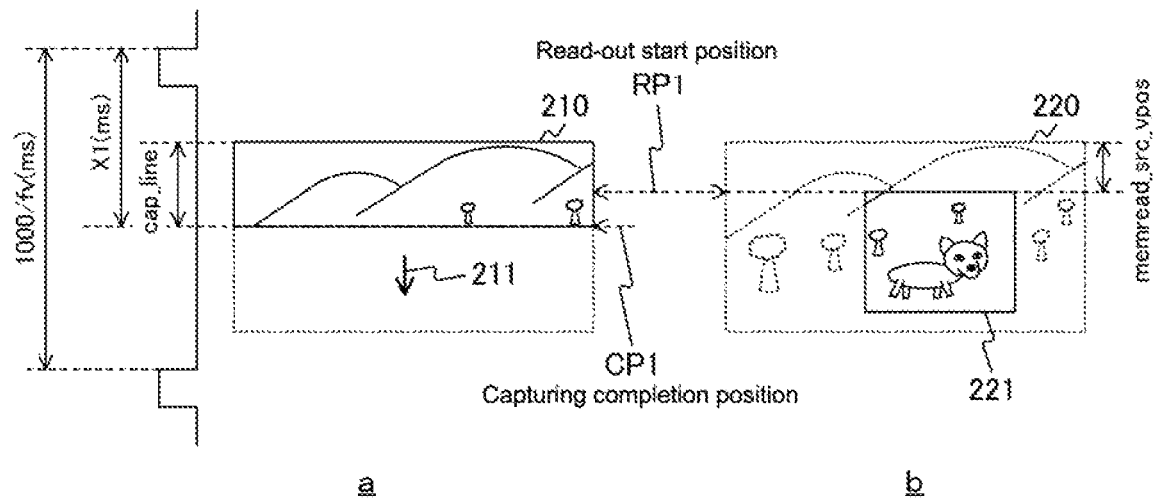
FIG. 5 A diagram showing an exemplary calculation of a delay amount by a control unit 190 in the embodiment of the present technology.

FIG. 5 is a diagram showing an exemplary calculation of a delay amount by the control unit 190 in the embodiment of the present technology. FIG. 5 shows an exemplary calculation of a delay amount in a case where the cropping display is performed (where stereoscopic image display, scaling display, and display position change are not considered).

In a of FIG. 5, an image signal to be written in the frame memory 160 is schematically shown in units of lines. Note that an image 210 shown in a of FIG. 5 (image corresponding to image signal written in frame memory 160) corresponds to the image 200 shown in FIG. 2. Thus, in a of FIG. 5, regarding the image 200 shown in FIG. 2, the image 210 in which writing is being performed in a lower direction (direction indicated by arrow mark 211) is shown.

Cap_line is a value indicating an effective image line number (Line) with respect to which writing in the frame memory 160 is completed.

Furthermore, X1 is a value indicating a delay amount (ms) in a case where the cropping display is performed (where stereoscopic image display, scaling display, and display position change are not considered).

Furthermore, fv is a value indicating a frame rate (Frame Rate) (Hz) of the image signal (video signal).

In b of FIG. 5, a range 221 of the image as a cut-out target is shown. Note that, in b of FIG. 5, an original image 220 is shown by the dotted line and the range 221 of the image as the cut-out target is shown by the thick-line rectangle in the original image 220.

Furthermore, memread_src_epos is a value indicating a line (Line) with respect to which the image processing unit 170 starts reading out the image from the frame memory 160. Furthermore, the position of this line is indicated by the arrow mark as a read-out start position RP1. Furthermore, the position of a line with respect to which writing in the frame memory 160 is completed is indicated by the arrow mark as a capturing completion position CP1.

Note that memread_src_epos is determined based on operation information relating a user's operation received by the UI unit 110 (instruction operation for cropping display).

As described above, in order to prevent the image processing unit 170 from reading a line with respect to which writing of the image signal in the frame memory 160 is not completed, overtaking writing, the control unit 190 calculates a delay amount X1 according to Expression 1 given below.

$$X1 = \{(memread\_src\_vpos + vsw + vbp)*(1000/fv)/vtotal\} \quad \text{Expression 1}$$

Note that a value that is equal to or larger than memread_src_epos may be used instead of memread_src_epos. In a of FIG. 5, the delay amount X1 (ms) determined according to the above Expression 1 is shown by using cap_line where cap_line>=memread_src_epos instead of memread_src_epos. Thus, in a of FIG. 5, the delay amount X1 is represented by the number of lines of the perpendicular effective display period cap_line.

As shown in b of FIG. 5, the read-out start position RP1 is delayed (located lower) in the cropping display than in full-screen display. Therefore, when the image processing unit 170 reads out the image signal stored in the frame memory 160, it is necessary that the read-out start position RP1 has been already captured. In view of this, the control unit 190 calculates the delay amount X1 satisfying Expression 1. Then, the image processing unit 170 reads out the image signal stored in the frame memory 160, delayed by the delay amount X1.

In this manner, when the instruction operation for cropping display is received, the control unit 190 calculates the delay amount, using the read-out start position (memread_src_epos) of the image signal in the frame memory 160 that is determined according to the instruction operation.

[Exemplary Calculation of Delay Amount in Case where Scaling Display or Display Position Change is Performed]

Figure 6:
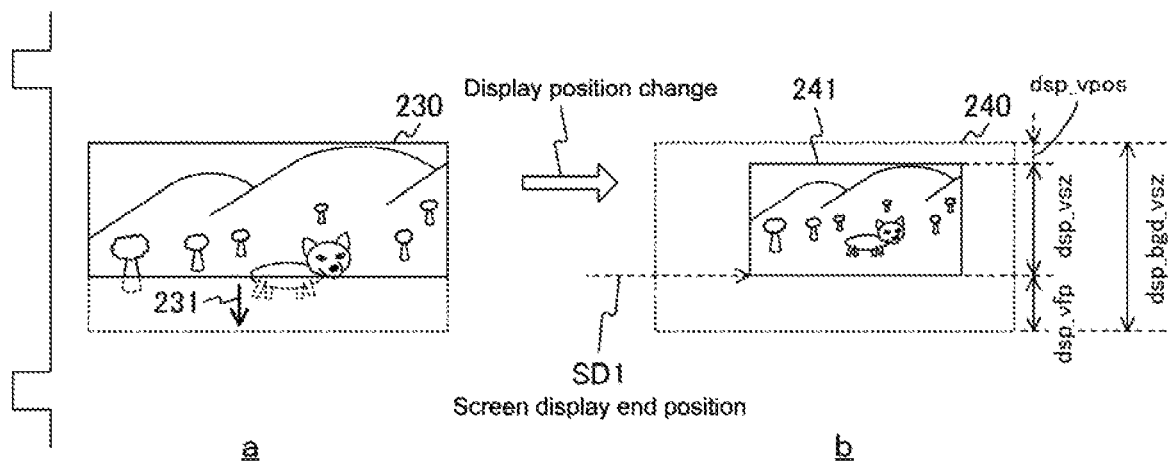
FIG. 6 A diagram showing an exemplary calculation of a delay amount by the control unit 190 in the embodiment of the present technology.

FIG. 6 is a diagram showing an exemplary calculation of the delay amount by the control unit 190 in the embodiment of the present technology. FIG. 6 shows an exemplary calculation of a delay amount in a case where the scaling display or the display position change is performed (where at least one of scaling display and display position change is performed). Note that FIG. 6 shows an example in a case where reduced display and display position change are performed, as an example in a case where the scaling display or the display position change is performed.

In a of FIG. 6, an image signal to be written in the frame memory 160 is schematically shown in units of lines. Note that an image 230 shown in a of FIG. 6 (image corresponding to image signal written in frame memory 160) corresponds to the image 200 shown in FIG. 2. Thus, in a of FIG. 6, regarding the image 200 shown in FIG. 2, an image 230 being written in the lower direction (direction indicated by arrow mark 231) is shown.

In b of FIG. 6, an image 241 as a display target in a case where the reduced display and the instruction operation for display position change are performed is shown. Note that, in b of FIG. 6, a range 240 of a display region in the display unit 180 is indicated by the dotted line and the image 241 as the display target is shown in position and size as the display target within the range 240 of the display region.

Furthermore, dsp_bgd_vsz is a value indicating a background V size for screen display. Furthermore, dsp_epos is a value indicating an image display start position after the scaling display. Furthermore, dsp_vsz is a value indicating a V size after the scaling display. Furthermore, dsp_vfp is a value determined according to the following Expression 2.

$$dsp\_vfp = dsp\_bgd\_vsz - dsp\_epos - dsp\_vsz \qquad \text{Expression 2}$$

Note that the values shown in b of FIG. 6 are determined based on operation information relating to a user's operation received by the UI unit 110 (instruction operation for reduced display and display position change).

Here, for example, in a case where an image as a display target is displayed on the full screen, it is possible to perform display for a time corresponding to a line of dsp_bgd_vsz. However, as shown in b of FIG. 6, when the image as the display target is displayed in a reduced state and the display position of the reduced image is moved upwards, a display end position of the image is moved. In this case, a timing when the image processing unit 170 performs reading out from the frame memory 160 becomes earlier. Thus, a time when the image processing unit 170 performs reading out from the frame memory 160 is a time corresponding to a line of dsp_vpos+dsp_vsz.

Thus, in a case where the scaling display and the instruction operation for display position change are performed, it is necessary to set the delay amount to be larger than the delay amount X1 determined according to Expression 1. For example, it is necessary to add (dsp_vfp/dsp_bgd_vsz)*(1000/fv) to the delay amount X1.

In view of this, the control unit 190 calculates a delay amount X2 according to Expression 3 given below. The delay amount X2 is a delay amount (ms) in a case where the scaling display and the display position change are performed. Note that, as described above, the example shown in FIG. 6 is an example in a case where the reduced display and the display position change are performed, and hence, now, a description will be made exemplifying a case where dsp_vpos+dsp_vsz<dsp_bgd_vsz.

$$X2 = X1 + (dsp\_vfp/dsp\_bgd\_vsz)*(1000/fv) \qquad \text{Expression 3}$$

In this manner, when at least one of the instruction operation for scaling display and the instruction operation for display position change is received, the control unit 190 calculates a delay amount, using the display position and display size of the image in the display region of the display unit that are determined according to the instruction operation. The display position and display size correspond to, for example, the values (dsp_epos, dsp_vsz, dsp_vfp, dsp_bgd_vsz) shown in b of FIG. 6.

[Exemplary Calculation of Delay Amount in Case where Stereoscopic Image is Displayed]

Although the example of displaying the plane image has been shown hereinabove, it is possible to calculate a delay amount also in a case where a stereoscopic image is displayed. Now, an example of 3D format (Frame Packing Interlace) according to HDMI (registered trademark) (High-Definition Multimedia Interface) standards will be described.

[Exemplary Relationship Between Writing in and Reading Out from Frame Memory]

Figure 7:
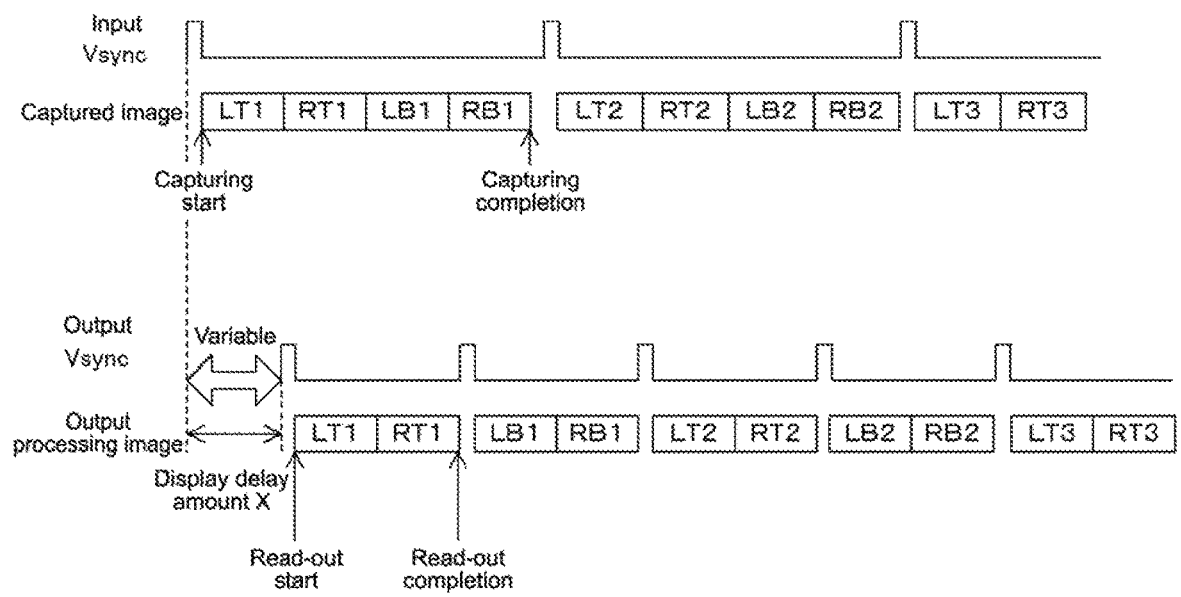
FIG. 7 A diagram showing an exemplary relationship between an image to be written in the frame memory 160 and an image to be read out from the frame memory 160 in the embodiment of the present technology.

FIG. 7 is a diagram showing an exemplary relationship between an image to be written in the frame memory 160 and an image to be read out from the frame memory 160 in the embodiment of the present technology. Note that FIG. 7 corresponds to FIG. 3 and the left and right directions are shown as a time axis.

On the upper side of FIG. 7, as in FIG. 3, an exemplary relationship between an image (captured image) stored in the frame memory 160 and Vsync (perpendicular synchronous signal). Furthermore, on the lower side of FIG. 7, as in FIG. 3, an exemplary relationship between an image to be read out from the frame memory 160 (output processing image) and Vsync (perpendicular synchronous signal) is shown.

Furthermore, the rectangles representing the images are denoted by the symbols LT1 to LT3, RT1 to RT3, LB1, LB2, RB1, RB2 therein. Furthermore, it is assumed that the number of the symbols indicates the order on the time axis as in FIG. 3.

Furthermore, it is assumed that the images LT1 to LT3 are left top images and the images RT1 to RT3 are right top images.

Furthermore, it is assumed that the images LB1, LB2 are left bottom images and the images RB1, RB2 are right bottom images.

Furthermore, writing in the frame memory 160 is performed in units of a combination of the left top image, the right top image, and the left bottom and right bottom images. Furthermore, reading out from the frame memory 160 is performed in units of a combination of the left top image and the right top image or a combination of the left bottom and right bottom images.

Furthermore, it is assumed that, on the upper side of FIG. 7, left end portions of the rectangles representing the combinations of the images (left top images, right top images, and left bottom and right bottom images) are capturing start positions. Furthermore, it is assumed that right end portions of the rectangles representing the combinations of the images are capturing completion positions.

Furthermore, it is assumed that, on the lower side of FIG. 7, left end portions of the rectangles representing the combinations of the images (left top images and right top images, left bottom and right bottom images) are read-out start positions. Furthermore, it is assumed that right end portions of the rectangles representing the images are read-out completion positions.

Furthermore, for reading out the image (captured image) stored in the frame memory 160, the image processing unit 170 performs reading out, delayed by a delay amount calculated by the control unit 190. The calculation of this delay amount will be described with reference to FIG. 8 in detail.

[Example of Image Signal Information]

Figure 8:
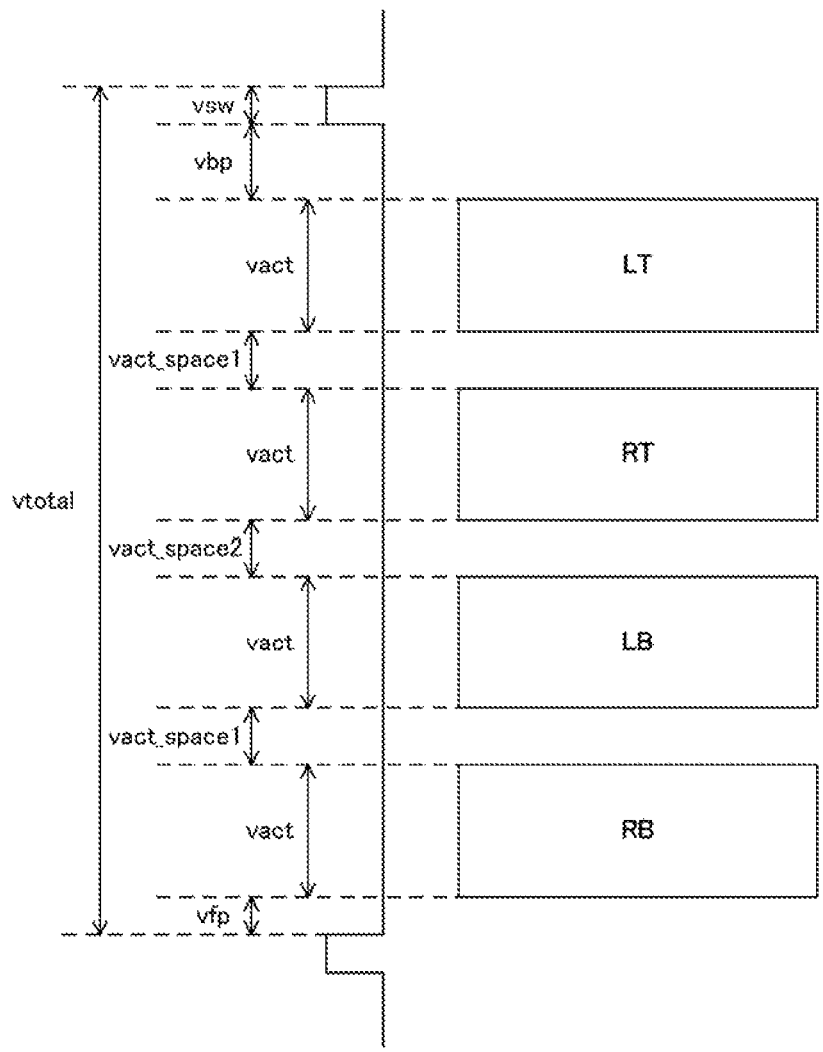
FIG. 8 A diagram showing an example of image signal information to be acquired by the acquisition unit 130 in the embodiment of the present technology.

FIG. 8 is a diagram showing an example of the image signal information acquired by the acquisition unit 130 in the embodiment of the present technology. FIG. 8 simplifies and shows images LT, RT, LB, RB to be written in the frame memory 160 by the rectangles. Thus, the images LT, RT, LB, RB are a combination of the images for displaying a stereoscopic image on the display unit 180. Furthermore, in FIG. 8, a relationship between the images LT, RT, LB, RB and the image signal information relating to the images LT, RT, LB, RB is schematically shown.

Vact_space1 is a value indicating vact space of the image signal of the stereoscopic image.

Note that other symbols are identical to those of FIG. 2. Thus, vsw is a value indicating a perpendicular synchronous signal width (Line). Furthermore, vact is a value indicating a perpendicular effective display period (Line). Furthermore, vfp is a value indicating a perpendicular front porch (Line) and vbp is a value indicating a perpendicular back porch (Line). Furthermore, vtotal is a value indicating a perpendicular total period (Line).

Now, an exemplary calculation of the delay amount in a case where the stereoscopic image display, the scaling display, and the display position change are considered will be described.

As shown in FIG. 8, some of the image signals for displaying the stereoscopic image include vact spaces. Regarding the image signals including the vact spaces, writing in the frame memory 160 is not performed in the period of the vact space. Therefore, the image signal before writing in the frame memory 160 is completed is not displayed, and hence it is necessary to add a delay amount to the delay amount X2, the delay amount corresponding to the amount of vact_space1.

Here, as shown in FIG. 7, the image processing unit 170 reads out a left image and a right image (L and R) for displaying the stereoscopic image from the frame memory 160, as a pair (L and R). Therefore, it is possible to make the delay amount the same on the top side and the bottom side. Furthermore, vact_space2 satisfies the following Expression 4.

$$vsw+vbp \geq vact\_space2 \qquad \text{Expression 4}$$

Therefore, for making the delay amount the same on the top side and the bottom side, the delay amount on the bottom side is adjusted to the delay amount on the top side.

In view of this, the control unit 190 calculates a delay amount X3 according to Expression 5 given below. The delay amount X3 is a delay amount (ms) in a case where the stereoscopic image display, the scaling display, and the display position change are considered. Furthermore, Expression 5 is an example in a case where the delay amount X3 for the image signal including vact_space is calculated.

$$X3 = X2 + vact\_space1 \qquad \text{Expression 5}$$

In this manner, the control unit 190 calculates the delay amount in the case of displaying the image based on the image signal for displaying the stereoscopic image on the display unit 180. In this case, the control unit 190 calculates the delay amount, using the period (vact_space1) in which writing is not performed when the image signal as a pair is written in the frame memory 160.

[Exemplary Relationship Between Writing Speed and Read-Out Speed]

Figure 9:
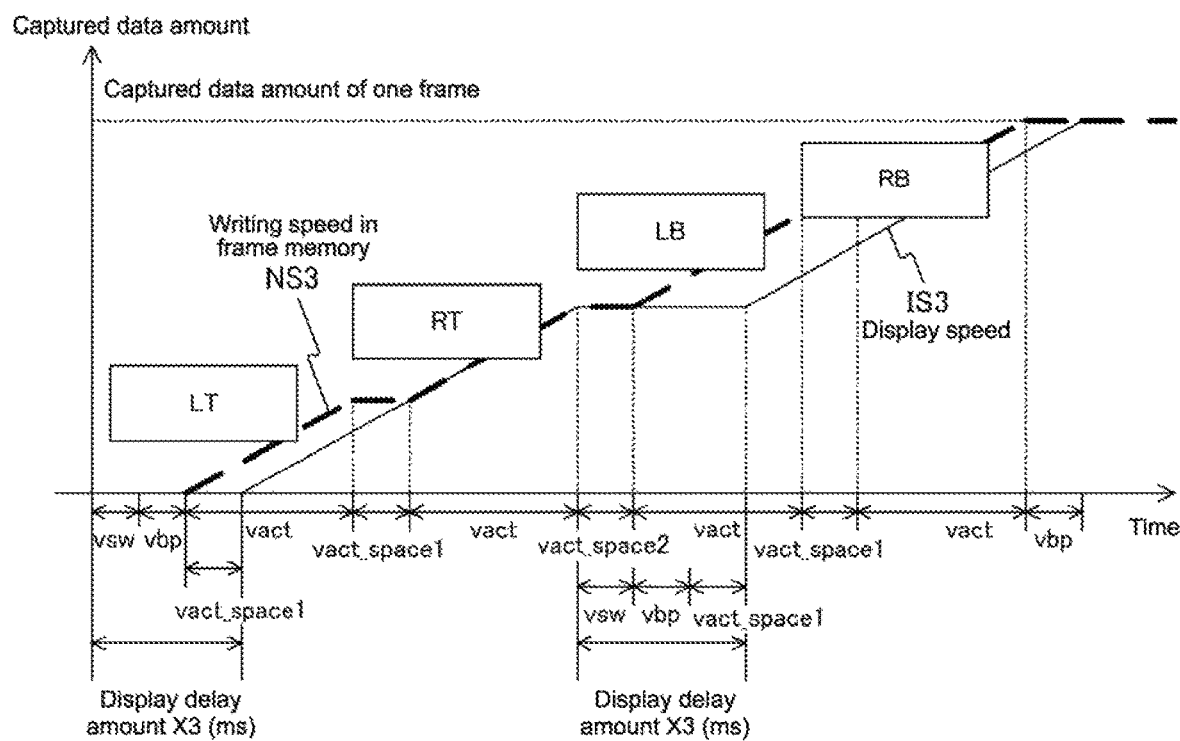
FIG. 9 A diagram showing an exemplary relationship between a writing speed in the frame memory 160 and a read-out speed from the frame memory 160 (display speed of display unit 180) in the embodiment of the present technology.

FIG. 9 is a diagram showing an exemplary relationship between a writing speed in the frame memory 160 and a read-out speed from the frame memory 160 (display speed of display unit 180) in the embodiment of the present technology. Note that FIG. 9 corresponds to FIG. 4, and the horizontal axis represents a time axis and the vertical axis represents an axis indicating a data amount.

Furthermore, FIG. 9 shows an example in a case where the stereoscopic image (3D format (Frame Paking Interlace) according to HDMI) standards is displayed at the same magnification. Thus, an example in a case where in which memread_src_vpos=0 (Expression 1) and dsp_vfp=0 (Expression 3) is shown.

NS3 denotes a straight line (thick dotted line) indicating the writing speed in the frame memory 160. Furthermore, IS3 denotes a straight line indicating the read-out speed from the frame memory 160 (display speed of display unit 180).

Furthermore, in FIG. 9, images LT, RT, LB, RB as display targets are virtually arranged and shown in corresponding positions.

Furthermore, in FIG. 9, for the sake of description, the symbols indicating corresponding lines are appropriately arranged on the horizontal axis representing a time axis.

[Exemplary Calculation for Delay Amount Considering Cropping Display, Stereoscopic Image Display, Scaling Display, and Display Position Change]

In the above, the exemplary calculation of the delay amount X1 according to Expression 1, the exemplary calculation of the delay amount X2 according to Expression 3, are the exemplary calculation of the delay amount X3 according to Expression 5 have been shown.

Here, by integrating Expression 1, Expression 3, and Expression 5, it is possible to calculate the delay amount X3, considering the cropping display, the stereoscopic image display, the scaling display, and the display position change. In view of this, hereinafter, an exemplary calculation of the delay amount X3 (ms) will be described.

The control unit 190 calculates the delay amount X3 according to the following Expression 6. Note that Expression 6 is an expression obtained by changing the expression form of Expression 5 and the delay amount X3 shown in Expression 6 is identical to the delay amount X3 shown in Expression 5.

$$X3=\{(memread\_src\_vpos+vsw+vbp)*(1000/fv)/vtotal\}+(dsp\_vfp/dst\_bgd\_vsz)*(1000/fv)+vact\_space1 \quad \text{Expression 6}$$

Note that memread_src_epos, vsw, vbp, fv, and vtotal are identical to those shown in FIG. 2 and b of FIG. 5. Furthermore, dsp_bgd_vsz, dsp_vfp, and dsp_vsz are identical to those shown in FIG. 6. Furthermore, vact_space1 is identical to that shown in FIG. 8.

In this manner, the control unit 190 is capable of calculating the delay amount X3 according to Expression 6. Thus, the control unit 190 calculates the delay amount in at least one of a case where at least one of the instruction operation for cropping display, the instruction operation for scaling display, and the instruction operation for display position change is received and a case where the stereoscopic image is displayed. In this case, the control unit 190 calculates the delay amount, using at least one of the read-out start position of the image signal, the display position and display size of the image in the display region of the display unit 180, and the period in which writing is not performed when the image signal as a pair is written.

Figure 10:
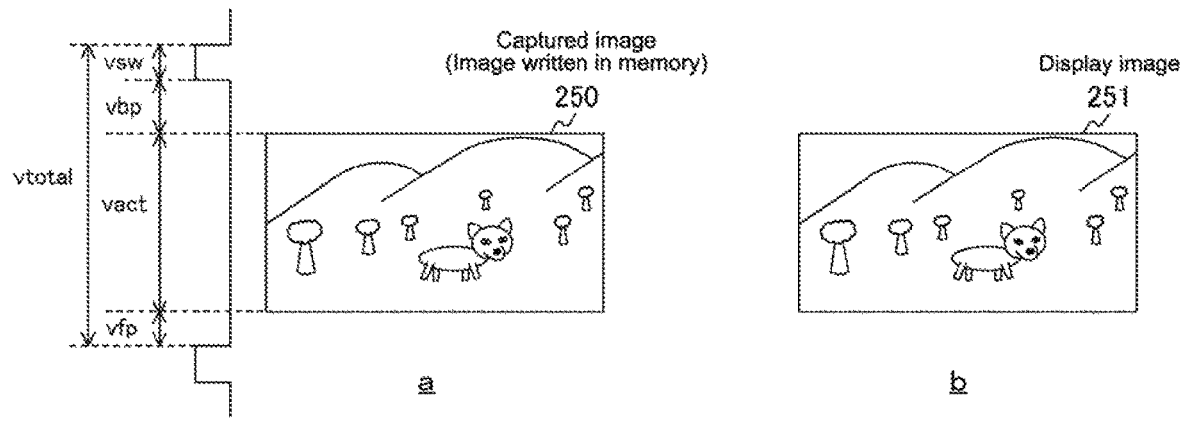
FIG. 10 A diagram showing an exemplary relationship between an image (captured image 250) to be written in the frame memory 160 and an image (display image 251) to be displayed on the display unit 180 in the embodiment of the present technology.
Figure 10:
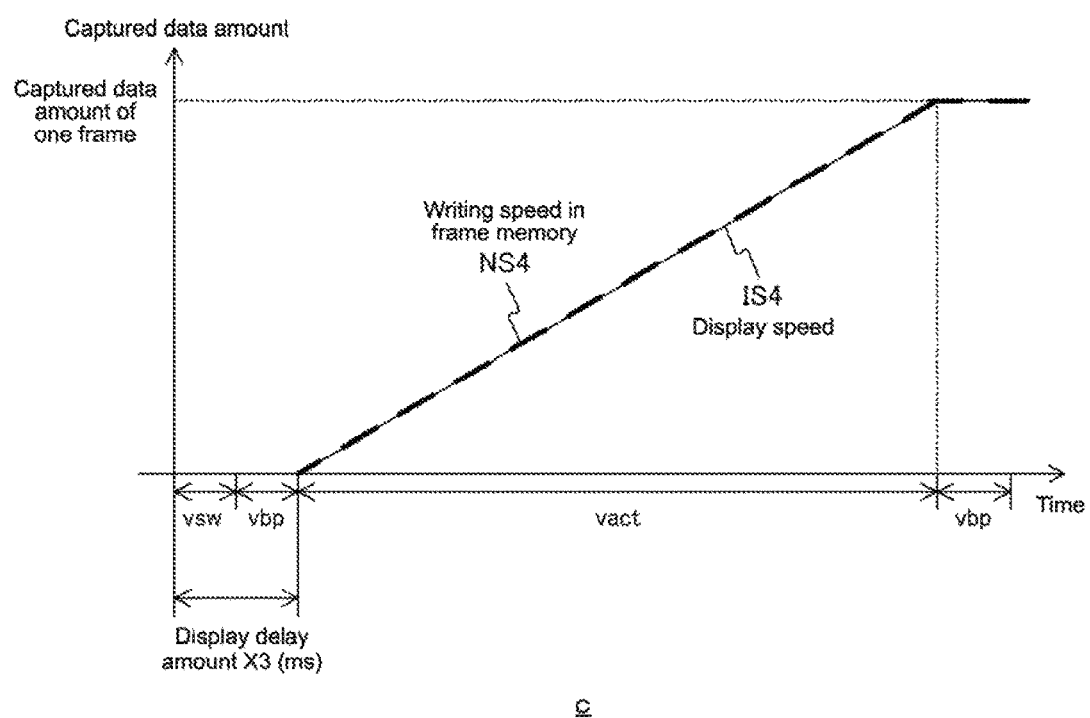
Figure 11:
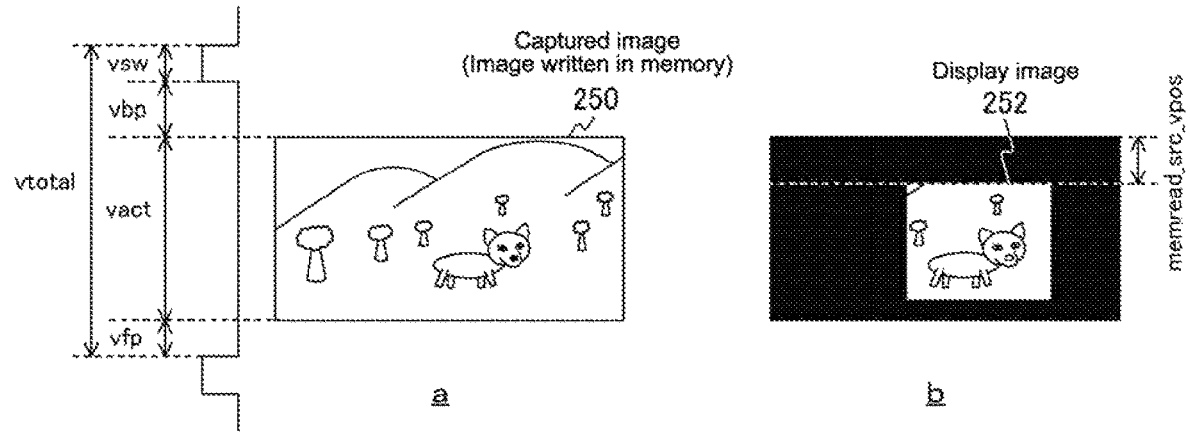
FIG. 11 A diagram showing an exemplary relationship between an image (captured image 250) to be written in the frame memory 160 and an image (display image 252) to be displayed on the display unit 180 in the embodiment of the present technology.
Figure 11:
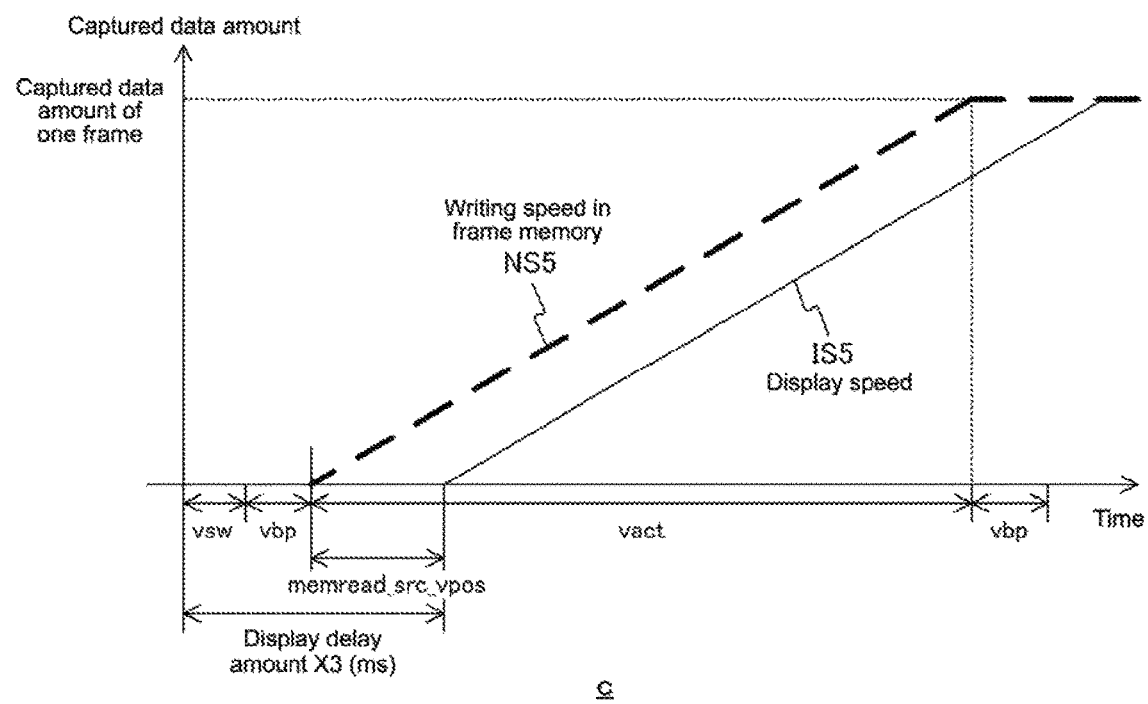
Figure 12:
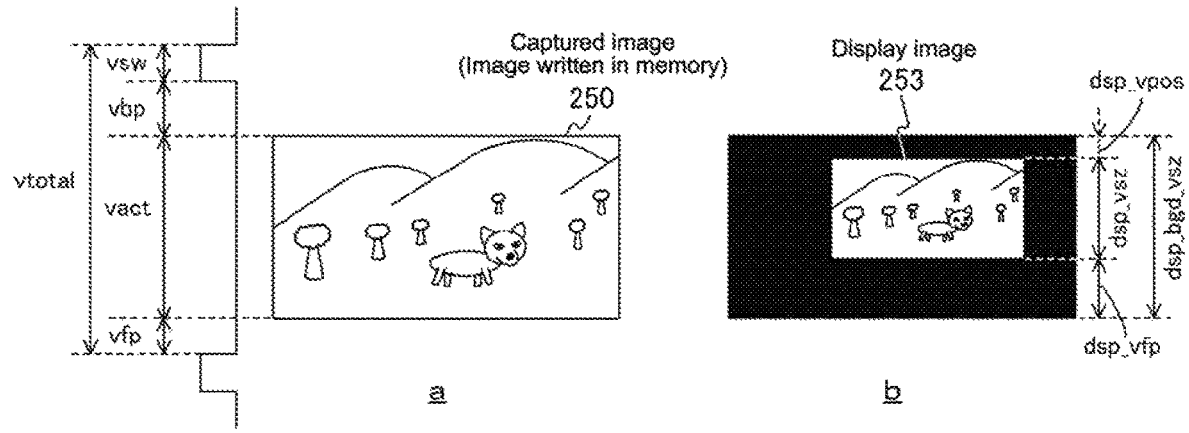
FIG. 12 A diagram showing an exemplary relationship between an image (captured image 250) to be written in the frame memory 160 and an image (display image 253) to be displayed on the display unit 180 in the embodiment of the present technology.
Figure 12:
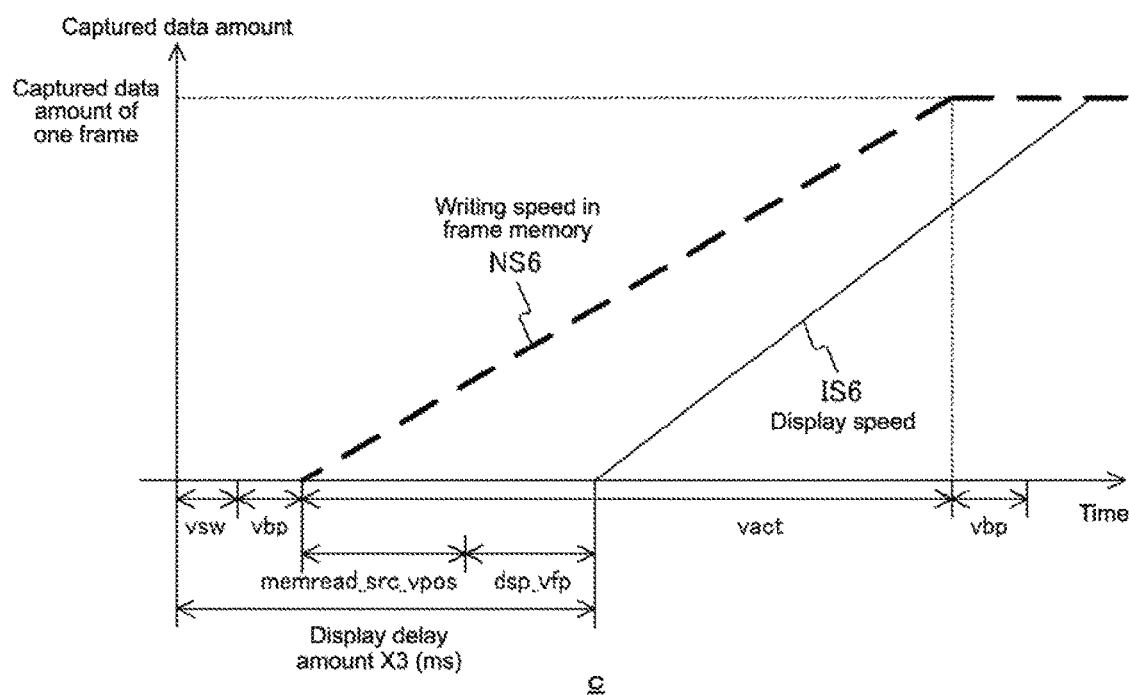

Furthermore, in FIGS. 10 to 12, an exemplary relationship between writing an image (captured image) and reading out an image (display image) in the case of using Expression 6 and an exemplary relationship between a writing speed and a read-out speed (display speed of display unit 180) are shown.

[Exemplary Relationship in Case where Image is Displayed at Same Magnification]

FIG. 10 is a diagram showing an exemplary relationship between an image (captured image 250) to be written in the frame memory 160 and an image (display image 251) to be displayed on the display unit 180 in the embodiment of the present technology. Furthermore, in c of FIG. 10, an exemplary relationship between the writing speed in the frame memory 160 and the read-out speed from the frame memory 160 (display speed of display unit 180) as in FIG. 4 is shown. Note that, in c of FIG. 10, the horizontal axis represents a time axis and the vertical axis represents an axis indicating a data amount as in FIG. 4.

Furthermore, FIG. 10 shows an example in a case where an image (two-dimensional image) is displayed at the same magnification. Thus, in Expression 6, an example in a case where vact_space=0, memread_src_vpos=0, and dsp_vfp=0 is shown.

In a and b of FIG. 10, an image (captured image 250) to be written in the frame memory 160 and an image (display image 251) to be displayed on the display unit 180 are shown. As described above, in FIG. 10, the example in which the image is displayed at the same magnification is shown, and hence the captured image 250 and the display image 251 are identical. Note that the symbols shown in a of FIG. 10 are identical to those in FIG. 2.

Furthermore, in c of FIG. 10, for the sake of description, the symbols indicating corresponding lines are appropriately arranged on the horizontal axis representing the time axis. Furthermore, NS4 denotes a straight line (thick dotted line) indicating the writing speed in the frame memory 160. Furthermore, IS4 denotes a straight line indicating the read-out speed from the frame memory 160 (display speed of display unit 180).

As described above, in FIG. 10, the example in the case where the image is displayed at the same magnification is shown, and hence the delay amount X3 is a value corresponding to vsw+vbp. Furthermore, the writing speed in the frame memory 160 and the read-out speed from the frame memory 160 (display speed of display unit 180) are approximately identical.

[Exemplary Relationship in Case where Cropping Display and Non-Magnified Display are Performed]

FIG. 11 is a diagram showing an exemplary relationship between an image (captured image 250) to be written in the frame memory 160 and an image (display image 252) to be displayed on the display unit 180 in the embodiment of the present technology. Furthermore, in c of FIG. 11, as in FIG. 4, an exemplary relationship between a writing speed in the frame memory 160 and a read-out speed from the frame memory 160 (display speed of display unit 180) is shown. Note that, in c of FIG. 11, the horizontal axis represents a time axis and the vertical axis represents an axis indicating a data amount as in FIG. 4.

Furthermore, FIG. 11 shows an example in which cropping display and non-magnified display are performed. Thus, an example in a case where vact_space=0, dsp_vfp=0 in Expression 6 is shown.

In a and b of FIG. 11, an image (captured image 250) to be written in the frame memory 160 and an image (display image 252) to be displayed on the display unit 180 are shown. As described above, in FIG. 11, the example in the case where the cropping display and the non-magnified display are performed is shown, and hence an image obtained by cutting out a part of the captured image 250 is displayed as the display image 252. Note that the symbols shown in a of FIG. 11 are identical to those in FIG. 2.

Furthermore, in c of FIG. 11, for the sake of description, the symbol indicating corresponding lines appropriately arranged on the horizontal axis representing the time axis. Furthermore, NS5 denotes a straight line (thick dotted line) indicating the writing speed in the frame memory 160. Furthermore, IS5 denotes a straight line indicating the read-out speed from the frame memory 160 (display speed of display unit 180).

As described above, in FIG. 11, the example in the case where the cropping display and the non-magnified display are performed is shown, and hence the delay amount X3 becomes a value corresponding to vsw+vbp+memread_src_epos. Furthermore, the writing speed in the frame memory 160 and the read-out speed from the frame memory 160 (display speed of display unit 180) are approximately identical.

[Exemplary Relationship in Case where Reduced Display, Cropping Display, and Display Position Change are Performed]

FIG. 12 is a diagram showing an exemplary relationship between an image (captured image 250) to be written in the frame memory 160 and an image (display image 253) to be displayed on the display unit 180 in the embodiment of the present technology. Furthermore, in c of FIG. 12, an exemplary relationship between a writing speed in the frame memory 160 and a read-out speed from the frame memory 160 (display speed of display unit 180) is shown in as in FIG. 4. Note that, in c of FIG. 12, the horizontal axis represents a time axis and the vertical axis represents an axis indicating a data amount as in FIG. 4.

Furthermore, in FIG. 12, an example in a case where the reduced display, the cropping display, and the display position change are performed is shown. Thus, an example in a case where vact_space=0 is shown in Expression 6.

In a and b of FIG. 12, an image to be written in the frame memory 160 (captured image 250) and an image to be displayed on the display unit 180 (display image 253) are shown. As described above, in FIG. 12, the example in the case where the reduced display, the cropping display, and the display position change are performed is shown, and hence an image obtained by reducing the size of the captured image 250 is displayed as the display image 253. Note that the symbols shown in a of FIG. 12 are identical to those in FIG. 2.

Furthermore, in c of FIG. 12, for the sake of description, the symbol indicating corresponding lines appropriately arranged on the horizontal axis representing the time axis. Furthermore, NS6 is a straight line (thick dotted line) indicating the writing speed in the frame memory 160. Furthermore, IS6 denotes a straight line indicating the read-out speed from the frame memory 160 (display speed of display unit 180).

As described above, in FIG. 12, the example in the case where the reduced display, the cropping display, and the display position change are performed, and hence the delay amount X3 is a value corresponding to vsw+vbp+memread_src_vpos+dsp_vfp. Furthermore, the writing speed in the frame memory 160 and the read-out speed from the frame memory 160 (display speed of display unit 180) are different.

[Operation Example of Image Processing Apparatus]

Figure 13:
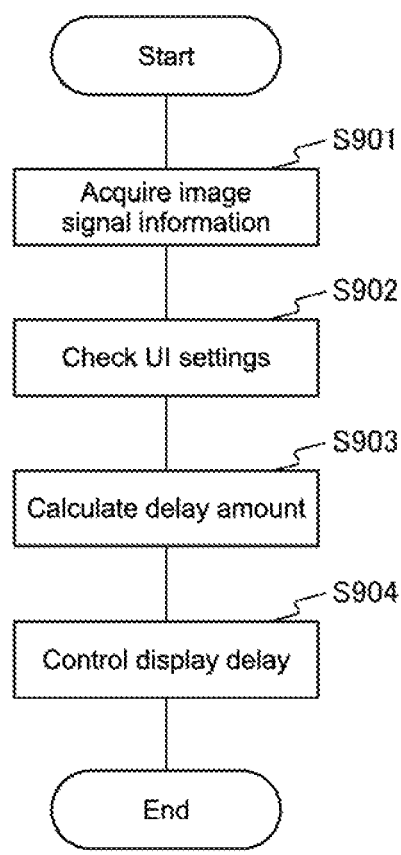
FIG. 13 A flowchart showing an example of a processing procedure of delay control by the image processing apparatus 100 in the embodiment of the present technology.

FIG. 13 is a flowchart showing an example of a processing procedure of the delay control by the image processing apparatus 100 in the embodiment of the present technology. Note that FIG. 13 shows an example in which the delay amount is calculated for each frame and the display delay is controlled.

First, the acquisition unit 130 acquires image signal information with respect to an image signal input by the image signal input unit 120 (Step S901). For example, the values (vsw, vbp, vact, vfp, vtotal) shown in FIG. 2 are acquired as the image signal information. Furthermore, for example, in a case where the image as the display target is a stereoscopic image, the values (vsw, vbp, vact, vact_space1, vact_space2, vfp, vtotal) shown in FIG. 8 are acquired as the image signal information. Note that Step S901 is an example of the acquisition procedure described in the scope of claims.

Subsequently, the control unit 190 acquires operation information relating a user's operation received by the UI unit 110 and checks UI settings (Step S902). For example, in a case where a user's operation for instruction to perform the cropping display is received, the value (memread_src_epos) shown in b of FIG. 5 is acquired as the operation information relating to the user's operation. Furthermore, for example, in a case where a user's operation for instruction to perform the reduced display and the display position change is received, the values (dsp_epos, dsp_vsz, dsp_vfp, dsp_bgd_vsz) shown in b of FIG. 6 are acquired as the operation information relating to the user's operation.

Subsequently, the control unit 190 calculates a delay amount based on the operation information output from the UI unit 110 and the image signal information output from the acquisition unit 130 (Step S903). For example, the control unit 190 calculates the delay amount X3 according to Expression 6 (Step S903).

Subsequently, the control unit 190 outputs the calculated delay amount to the image processing unit 170 and sets the display delay (Step S904). With this, for example, the image processing unit 170 delays reading out of the image signal stored in the frame memory 160, based on the delay amount X3 calculated by the control unit 190. Note that Steps S903 and S904 are examples of the control procedure described in the scope of claims.

Note that although the example in which the delay amount is calculated and used for each frame is shown in FIG. 13, the delay amount may be calculated and used only for each of frames in predetermined intervals. Furthermore, for example, the delay amount may be calculated and used only in a case where a particular state is obtained. Note that the particular state can be, for example, a state immediately after a particular user's operation (e.g., instruction operation for cropping display, scaling display, display position change) is received. Furthermore, the particular state can be, for example, a state immediately after an instruction to display a stereoscopic image is performed.

In this manner, according to the embodiment of the present technology, in PC output or reproduction of game content, a delay amount can be set to prevent the user from feeling a delay (display delay) of the display image signal with respect to the input image signal. Thus, in PC output or reproduction of game content, a low delay can be set without giving the user uncomfortable feeling. Furthermore, the embodiment of the present technology is also applicable to the display of a stereoscopic image.

For example, even in a case where a user's operation for instruction to perform the scaling display, the cropping display, and the display position change is performed, it is possible to perform adjustment to a minimum delay amount by dynamically changing the display delay. Therefore, for example, as long as scaling rate, cropping, or the like is not suddenly changed, it is possible to prevent the delay amount from rapidly increasing which gives the user uncomfortable feeling. Thus, it is possible to prevent the display delay from rapidly increasing and reduce the uncomfortable feeling given to the user.

In this manner, according to the embodiment of the present technology, it is possible to set a suitable display delay and enhance the performance of the display delay.

Note that the above-mentioned embodiment shows an example for embodying the present technology and the matters in the embodiment and the invention-specifying matters in the scope of claims have corresponding relationships. Similarly, the invention-specifying matters in the scope of claims and the matters in the embodiment of the present technology that are referred to as the identical names have corresponding relationships. It should be noted that the present technology is not limited to the embodiment and can be embodied by various modifying the embodiment without departing from the gist thereof.

Furthermore, the processing procedure described in the above embodiment may be construed as a method including the series of procedures or may be construed as a program for causing a computer to execute the series of procedures or as a recording medium that stores the program. As this recording medium, for example, a CD (Compact Disc), an MD (Mini Disc), a DVD (Digital Versatile Disc), a memory card, or a Blu-ray (registered trademark) Disc can be used.

Note that the effects described in the present specification are merely examples and not limitative and other effects may be provided.

Note that the present technology may also take the following configurations.

(1) An image processing apparatus, including:

an acquisition unit that acquires image signal information that is used in displaying an image based on a transmitted image signal, from the image signal; and a control unit that controls, based on operation information relating to a user's operation for changing a display mode of the image and the acquired image signal information, a display delay in displaying the image.

(2) The image processing apparatus according to (1), in which
the control unit calculates a delay amount in reading out the image signal from a frame memory storing the image signal and controls the display delay based on the delay amount.

(3) The image processing apparatus according to (2), in which
the control unit calculates, when an instruction operation for cropping display is received as the user's operation, the delay amount, using a read-out start position of the image signal in the frame memory that is determined according to the user's operation.

(4) The image processing apparatus according to (2) or (3), in which
the control unit calculates, when at least one of an instruction operation for scaling display and an instruction operation for display position change is received as the user's operation, the delay amount, using display position and display size of the image in a display region of a display unit that are determined according to the user's operation.

(5) The image processing apparatus according to any of (2) to (4), in which
the control unit calculates the delay amount when an image based on an image signal for displaying a stereoscopic image is displayed.

(6) The image processing apparatus according to (5), in which
the control unit calculates the delay amount, using a period in which writing is not performed in writing an image signal as a pair in the frame memory.

(7) The image processing apparatus according to (2), in which
the control unit calculates the delay amount in at least one case of a case where at least one of an instruction operation for cropping display, an instruction operation for scaling display, and an instruction operation for display position change is received as the user's operation and a case where an image based on an image signal for displaying a stereoscopic image is displayed.

(8) The image processing apparatus according to (7), in which
the control unit calculates the delay amount, using at least one of a read-out start position of the image signal in the frame memory that is determined according to the user's operation, display position and display size of the image in a display region of a display unit that are determined according to the user's operation, and a period in which writing is not performed in writing an image signal as a pair in the frame memory.

(9) An image processing method, including:
an acquisition procedure that acquires image signal information that is used in displaying an image based on a transmitted image signal, from the image signal; and
a control procedure that controls, based on operation information relating to a user's operation for changing a display mode of the image and the acquired image signal information, a display delay in displaying the image.

(10) A program that causes a computer to execute:
an acquisition procedure that acquires image signal information that is used in displaying an image based on a transmitted image signal, from the image signal; and
a control procedure that controls, based on operation information relating to a user's operation for changing a display mode of the image and the acquired image signal information, a display delay in displaying the image.

DESCRIPTION OF REFERENCE NUMERALS 100 image processing apparatus
110 UI unit
120 image signal input unit
130 acquisition unit
140 timing control unit
150 preprocessing unit
160 frame memory
170 image processing unit
180 display unit
190 control unit

The invention claimed is:

1. An image processing apparatus, comprising:
circuitry configured to:
acquire image signal;
acquire image signal information of an image from the acquired image signal, wherein the acquired image signal information is at least one of a frequency of the image or a size of the image;
store the acquired image signal in a frame memory, wherein the acquired image signal is stored as a pair of a left image signal and a right image signal;
receive a first user operation to change a display mode of the image;
calculate a delay amount to read out the acquired image signal from the frame memory, wherein
the delay amount is calculated based on the received first user operation, the acquired image signal information, and a specific time period, and
the specific time period is a time period from an end of one of the left image signal or the right image signal to a start of the other of the left image signal or the right image signal;
control a delay in display of the image based on the calculated delay amount; and
control a display device to display the image, wherein the display device is controlled based on the delay.

2. The image processing apparatus according to claim 1, wherein
the circuitry is further configured to calculate the delay amount based on a read-out start position of the image signal in the frame memory and a second user operation to crop the image, and
the read-out start position is based on the second user operation.

3. The image processing apparatus according to claim 1, wherein
the circuitry is further configured to calculate the delay amount based on receipt of at least one of a third user operation to scale the image or a fourth user operation to change a display position of the image,
the delay amount is calculated based on the display position and a display size of the image in a display region of the display device,
the display position of the image is based on the fourth user operation, and
the display size of the image is based on the third user operation.

4. The image processing apparatus according to claim 1, wherein the circuitry is further configured to calculate the delay amount that corresponds to the image based on the acquired image signal to display a stereoscopic image.

5. The image processing apparatus according to claim 1, wherein the circuitry is further configured to calculate the delay amount in at least one of:
   a case where the image is displayed based on the acquired image signal to display a stereoscopic image, or
   a case where at least one of a second user operation to crop the image, a third user operation to scale the image, or a fourth user operation to change a display position of the image is received.

6. The image processing apparatus according to claim 5, wherein the circuitry is further configured to calculate the delay amount based on at least one of:
   a read-out start position of the acquired image signal in the frame memory, wherein the read-out start position is based on the second user operation, or
   the display position and a display size of the image in a display region of the display device, wherein the display position of the image is based on the fourth user operation and the display size is based on the third user operation.

7. The image processing apparatus according to claim 1, wherein the circuitry is further configured to control the delay based on a display speed of the display device and a writing speed in the frame memory.

8. An image processing method, comprising:
   acquiring image signal;
   acquiring image signal information of an image from the acquired image signal, wherein the acquired image signal information is at least one of a frequency of the image or a size of the image;
   storing the acquired image signal in a frame memory, wherein the acquired image signal is stored as a pair of a left image signal and a right image signal;
   receiving a user operation to change a display mode of the image;
   calculating a delay amount to read out the acquired image signal from the frame memory, wherein
      the delay amount is calculated based on the received user operation, the acquired image signal information, and a specific time period, and
      the specific time period is a time period from an end of one of the left image signal or the right image signal to a start of the other of the left image signal or the right image signal;
   controlling a delay in display of the image based on the calculated delay amount; and
   controlling a display device to display the image, wherein the display device is controlled based on the delay.

9. A non-transitory computer-readable medium having stored thereon, computer-executable instructions that, when executed by a computer, cause the computer to execute operations, the operations comprising:
   acquiring image signal;
   acquiring image signal information of an image from the acquired image signal, wherein the acquired image signal information is at least one of a frequency of the image or a size of the image;
   storing the acquired image signal in a frame memory, wherein the acquired image signal is stored as a pair of a left image signal and a right image signal;
   receiving a user operation to change a display mode of the image;
   calculating a delay amount to read out the acquired image signal from the frame memory, wherein
      the delay amount is calculated based on the received user operation, the acquired image signal information, and a specific time period, and
      the specific time period is a time period from an end of one of the left image signal or the right image signal to a start of the other of the left image signal or the right image signal;
   controlling a delay in display of the image based on the calculated delay amount; and
   controlling a display device to display the image, wherein the display device is controlled based on the delay.

* * * * *